July 11, 1961  H. S. KATZENSTEIN ET AL  2,991,650
SONIC FLOW METER
Filed March 7, 1956  3 Sheets-Sheet 1

*INVENTORS*
HENRY S. KATZENSTEIN
and JACK KATZENSTEIN
BY
*Joseph Zeller*
Atty

July 11, 1961

H. S. KATZENSTEIN ET AL 2,991,650

SONIC FLOW METER

Filed March 7, 1956

INVENTORS
HENRY S. KATZENSTEIN
and JACK KATZENSTEIN
BY
Joseph Zaller
Atty

United States Patent Office 2,991,650
Patented July 11, 1961

2,991,650
SONIC FLOW METER
Henry S. Katzenstein, Bedford, Mass. (171 Highland Ave., Leonia, N.J.), and Jack Katzenstein, Lincoln, Mass. (1614 Bayita Lane NW., Albuquerque, N. Mex.)
Filed Mar. 7, 1956, Ser. No. 569,988
11 Claims. (Cl. 73—194)

This invention relates to apparatus for measuring the rate of flow of moving fluids in pipes. In particular, it relates to a sonic apparatus for accurately measuring a wide range of flow rates of a wide variety of fluids and obtaining instantaneous and cumulative readings thereof.

Sonic flow meters have been described which attempt to measure flow by comparing the velocity of a sonic wave propagated downstream with the velocity of a sonic wave propagated upstream. Certain of such devices either measure the difference in time for the travel of the two waves along physically separate sonic paths or utilize these times to determine the difference in frequencies between two separate pulse regenerating systems. Having two physically separate paths inevitably results in an unavoidable small difference in path lengths such that the difference in time equals $$\frac{L}{C}\left[\frac{\Delta L}{L}+\frac{2V}{C}\right]$$

instead of $$\frac{2LV}{C^2}$$

where $L$=path length, $\Delta L$=path length error, $V$=flow velocity, and $C$=speed of sound in the fluid. Since $V/C$ approximates 0.0001 for small flow rates this path error is very significant where small flow rates are to be measured, in the absence of very high and very expensive precision. For example, if there is to be a 1% error, the precision required for a path length of one foot in water with 3 ft./second flow is 1/6250 of an inch.

Another of these previously described sonic flow meters has a single sonic path but utilizes a switch to alternate the roles of each transducer from transmitter to receiver and back. Such switches require extremely high rejection ratios because of the great difference in level between the transmitted and received signals, otherwise the transmitting signal would leak through and overwhelm the received signal. Such high rejection ratios require high cost and complexity to achieve acquired accuracy and stability.

One object of this invention is to provide a sonic flow measuring apparatus which is relatively simple and inexpensive and is accurate and stable at all rates of flow including very low flow rates. A further object of this invention is to provide such apparatus which can be used with any size pipe diameter and can be operated at any convenient frequency of oscillation. Yet another object of this invention is to provide such an apparatus which has a high speed of response and is independent of the nature or the temperature of the fluid being measured. A still further object of this invention is to provide such apparatus which can indicate and display flow transients and direction of flow and which can provide accurate, instantaneous and cumulative readings of volume flow, mass flow and Mach number.

In its broadest sense this invention comprises providing a single sonic path of fixed length within a pipe carrying moving fluid, simultaneously propagating sonic pulses of identical configuration from each end of the path to the other end and measuring the difference in time it takes for the pulses to reach the opposite ends of the path. More specifically this invention comprises providing two single sonic two-electrical terminal transducers coupled to the flowing fluid and spaced apart therein, simultaneously supplying electrical pulses of identical configuration to each of said two transducers, thus causing sonic pulses to be propagated from one transducer to the other, allowing each transducer to receive the sonic pulses propagated from the other transducer and measuring the difference in phase or time between the received pulses relative to the difference in phase between the initial pulses. The difference in phase, for example, can be translated into a voltage which is directly proportional to the velocity of the flowing fluid and inversely proportional to the square of the speed of sound in the fluid at the particular temperature. Where pulses are short and the band width wide, it is preferable to measure time directly rather than phase difference. Further, where the temperature and composition of fluid are essentially known and constant, a pre-set repetition rate may be used. The repetition rate of the primary electrical pulses is preferably controlled by the time it takes a single sonic pulse to arrive at its opposite transducer and be reflected back to its source. The repetition rate is thus proportional to the speed of sound in the fluid. By appropriate computing circuits the velocity of the fluid can be measured independently of temperature and turbulence in the fluid.

In the case of pipe materials having low absorption of sonic energy in the wall at the selected frequency, transducers are mounted inside the pipe and thus directly coupled to the fluid, as in the case of metal pipes. With pipe materials having a relatively high absorption of sonic energy in the wall, the transducers may be coupled through the pipe by being mounted on the outside as in the case of plastic pipes, or plastic windows in metal pipes. It should be noted that the term "transducer" is used in this specification and appended claims to denote a transducer having two electrical terminals and one sonic terminal, such as a single quartz crystal, a single barium titanate unit, or a single magnetostriction assembly. It is preferred that the orientation of the transducers be such that they be directly opposed to one another as regards maximum amount of propagation. In the case of directly coupled transducers, it is preferred to space them so as to oppose each other along the axis of flow. In the case of exteriorly mounted or indirectly coupled transducers, they are preferably mounted parallel to the axis of flow.

Other objects and advantages of this invention will be apparent from a detailed description of a specific embodiment of this invention, with reference to the appended drawings, wherein FIGURE 1 is a longitudinal section of a U-shaped metal pipe showing transducers mounted inside and axially;

Figure 1:
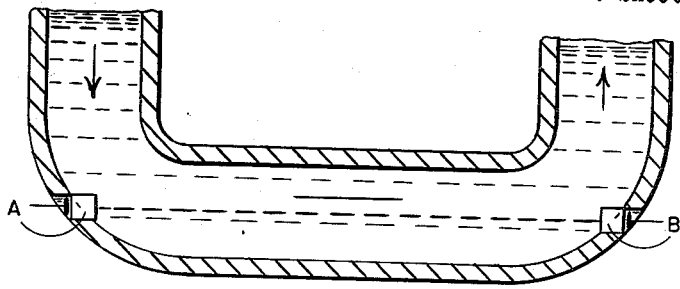
Figure 2:
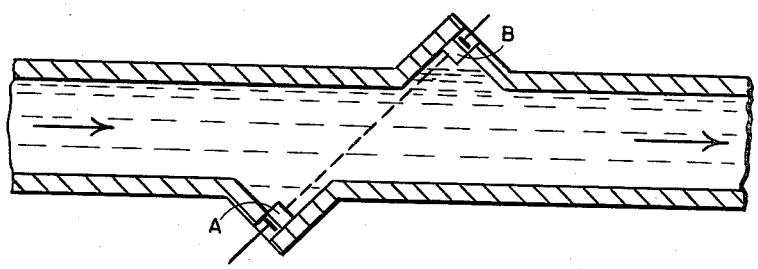
FIGURE 2 is a longitudinal section of a metal pipe showing two transducers mounted inside the pipe in specially prepared extensions so that the rectilinear path between them intersects the axis of the pipe.
Figure 3:
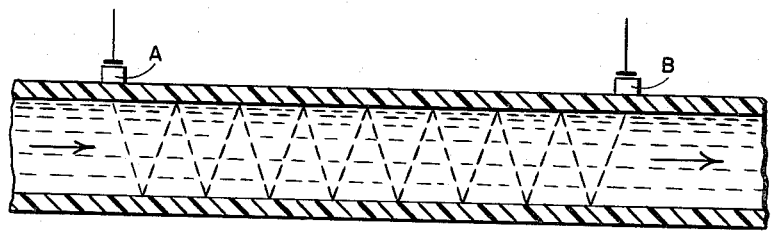
FIGURE 3 is a longitudinal section of a plastic pipe showing two externally mounted transducers aligned along a line parallel to the axis of the pipe so that the transverse waves are propagated along the axis.

In FIGURES 1, 2, and 3, A in each case denotes the upstream transducer, while B denotes the downstream transducer. The dotted lines in FIGURES 1 and 2 illustrate the path of propagation between the transducers. In FIGURE 3 the dotted lines are used to illustrate the transverse mode of vibration.

While positioning of transducers can be done in various ways in the pipe, it is preferred to use the diagonal arrangement of FIGURE 2 for directly coupled transducers in ordinary flow as opposed to the U-bend of FIGURE 1, since the latter U-bend may introduce non-characteristic qualities which would be reflected in the readings.

Figure 4:
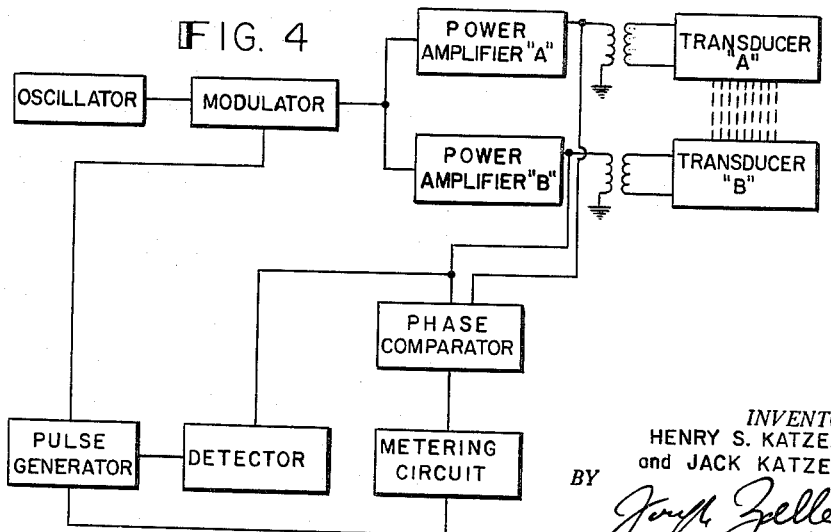
FIGURE 4 is a general diagrammatic view of circuitry for use with the transducers.

This invention can be understood in its general sense by reference to FIGURE 4. An oscillator is arranged to feed a continuous wave train of selected frequency into a modulator which is controlled by a pulse generator to form finite wave trains or pulses. Each pulse is simultaneously fed into power amplifier A and power amplifier B, and thence through separate transformers to separate transducers A and B (e.g. the barium titanate transducer described in page 259, FIGURE 7–10 Hueter and Bolt, "Sonics," John Wiley, 1955). The transducers A and B are selected to be identical and of a resonant frequency equal to the frequency of the oscillator. From either the primaries or the secondaries of the transformers, leads are made to a phase comparator which produces a voltage proportional to the difference in phase between sonic pulse A received by transducer B and sonic pulse B received by transducer A, this voltage in turn being supplied to a metering circuit. A detector is provided which actuates the pulse generator when a sonic pulse has been reflected back from its opposing transducer to its source, thus allowing the next succeeding original pulse to be fired by the modulator. As regards FIG. 4, the connection between a metering circuit and the pulse generator is readily understood by reference to numerals 26 and 27 and FIG. 5 where there is a connection from the plate 26B to the modulator 12. Because the metering circuit may involve or require a quantity proportional to the speed of sound C in the fluid for computation, provision must be made to introduce the repetition frequency into the metering circuit, the repetition frequency proportional to C.

Figure 5:
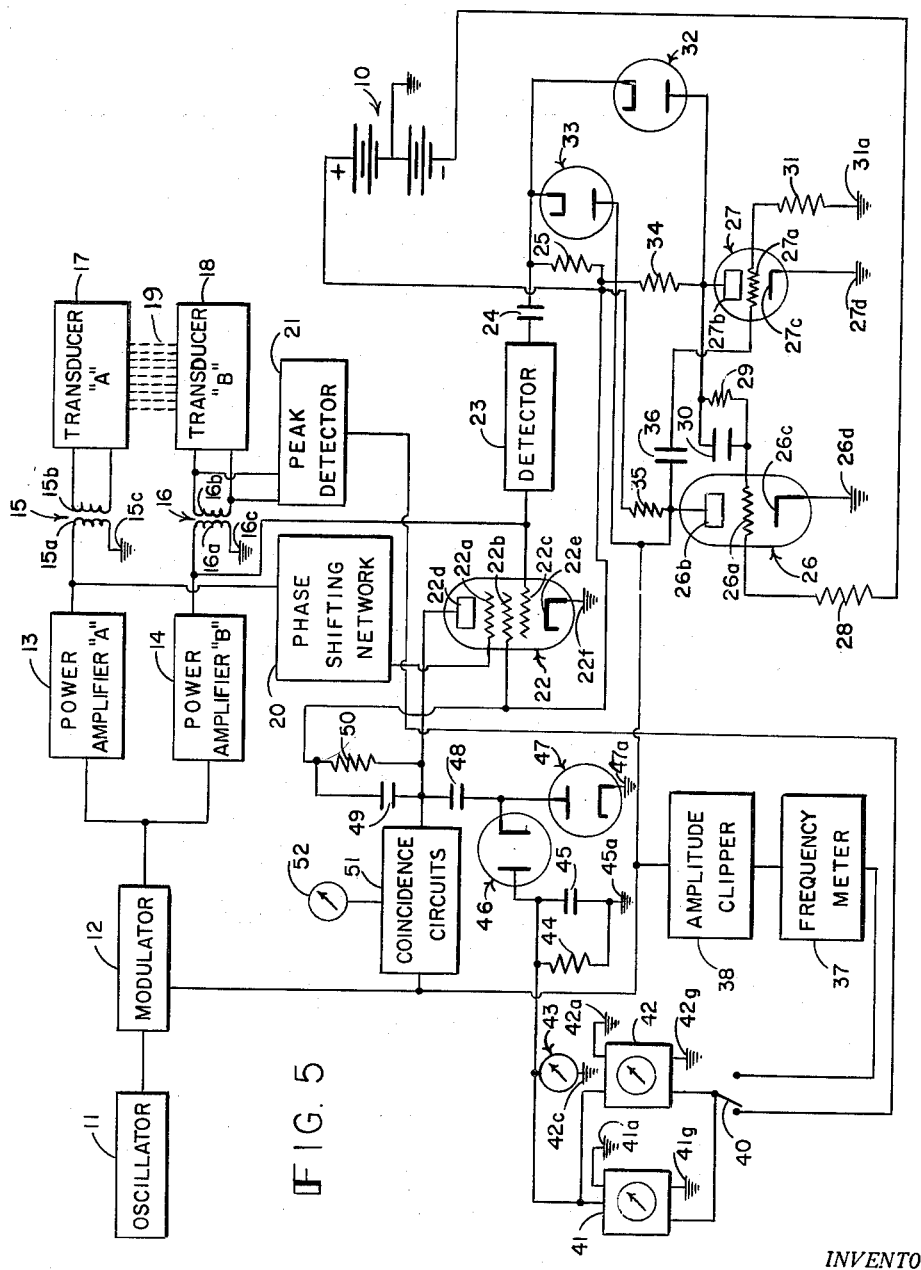
FIGURE 5 is a diagrammatic view of the circuitry used in a preferred embodiment.

An example as shown in FIGURE 5 of a phase comparator suitable for use in this invention is a pentode having sharp cut-off at the first and third grids (gated beam pentode). If the primaries of each transformer are used, one connection is made to the first grid and the other through a phase shifting network to the third grid. The tube produces a rectangular signal the height of which is proportional to the phase difference of the AC signals applied to the first and third grid. A detector and multivibrator circuit are connected to the grid having the direct connection, the output of the multivibrator providing the square waves controlling repetition frequency in the modulator. This latter output is also fed through an amplitude clipper to provide a voltage proportional to the speed of sound (C) in the fluid.

The output of the pentode is fed through a diode metering circuit to provide a voltage proportional to the ratios of the velocity of the fluid to the speed of sound in the fluid ($V/C$). The two said voltages are multiplied in a dynamometer galvanometer to give a direct reading of the velocity of flow, independent of variations in the speed of sound in the fluid such as are caused by changes in temperature and turbulence.

Mass flow is also independently obtainable by multiplying the "$V/C$" voltage by a voltage proportional to the product of density and speed of sound in the fluid ($\rho C$). This latter voltage is proportional to the specific acoustic impedance of the fluid and is the output of a peak detector placed across one of the transducers. Total mass flow or total volumetric flow at any given instance is obtained by using an integrating device such as a watt-hour meter in parallel with the galvanometer. Direction of flow is obtainable by a coincidence circuit which compares the output of the pentode with the repetition control input from the multi-vibrator to the modulator.

Having reference to FIGURE 5, the significant detail of a preferred embodiment may be explained as follows:

An oscillator 11, which may be of the quartz crystal controlled type sends continuous waves of fixed frequency, e.g. 1.5 megacycle/second into modulator 12 (e.g. the modulator circuit illustrated on page 391, FIGURE 11.1 of "Wave Forms," McGraw-Hill, 1949, volume 19 of M.I.T. Radiation Laboratory series) which serves to generate finite wave trains or pulses to be fed into power amplifier 13 and power amplifier 14. The repetition frequency of the pulses is determined by the frequency of the square wave signal fed into the bottom of the modulator block 12. The pulse signals supplied to amplifiers 13 and 14 are amplified and fed into primaries 15a and 16a respectively of transformers 15 and 16. Transducer 17 is connected to the secondary 15b of transformer 15 while transducer 18 is connected to the secondary 16b of transformer 16. The path 19 represents the sonic path between transducers 17 and 18.

From the primary 15a a connection is made to a phase shifting network 20, which in this case is a 90° phase shifting network and thence to the grid 22a of a gated beam pentode 22 (e.g. General Electric 6BN6). Another connection is also made from primary 16a to grid 22c of the pentode. Thus when grids 22a and 22c are simultaneously positive with respect to cathode 22e current flows in the plate circuit 22d depending on the plate voltage and the plate resistor 50. The plate circuit comprises D.C. source 10, resistor 50, plate 22d, cathode 22e, and ground 22f. Current flows from this plate circuit for the period of time corresponding to both grids 22a and 22c being positive. If the fluid in the pipe is stationary, all signals reaching the grid are 90° out of phase to one another so that both grids are positive simultaneously for one-quarter of each cycle. Hence, the average plate current is one-quarter the peak, instantaneous plate current. If the fluid is in motion, the phase shift differs from 90° and the average plate current is more or less than the normal value, depending on the direction of the fluid flow. Capacitor 49 is provided in parallel with resistor 50 to average the voltage at plate 22d so that the voltage is an indication of the phase relationship between the signals applied to grids 22a and 22c. When the fluid is still, the pulses in the plate voltage are of constant height, but under conditions of flow square pulses of voltage appear whose height is proportional to the velocity of the fluid and inversely proportional to the square of the speed of sound in the fluid ($V/C^2$).

This relationship can be shown as follows: Where "$t$" is time, "$L$" is length, "$C$" is speed of sound in the fluid, and "$V$" is velocity of the fluid $$t_{(upward)} = \frac{L}{C-V}; \quad t_{(downward)} = \frac{L}{C+V}$$

Therefore, the difference in time equals $$L\left(\frac{1}{C-V} - \frac{1}{C+V}\right) = \frac{2LV}{C^2-V^2}$$

Inasmuch as "$V$" is insignificant in comparison with "$C$," the difference in time reduces to $$\frac{2LV}{C^2}$$

Inasmuch as the phase detector proportionately converts this time difference into height, the phase difference as received will be equal to $$2\pi\left(\frac{2LV}{C^2}\right) = \frac{4\pi(LV)}{C^2}$$

Inasmuch as the frequency and length are constant in any given system, the height of the pulses will be directly proportional to the velocity of the fluid of and inversely proportional to the square of the speed of sound in the fluid.

A detector 23 (e.g. the detector circuit illustrated on page 503 of said "Wave Forms") is connected to grid 22c and converts the pulse applied to the grid into a negative square pulse which is differentiated by a capacitor 24 and resistor 25, to produce negative trigger pulses. These negative detector pulses serve to actuate triodes 26 and 27 so as to control the repetition frequency applied to the modulator 12. The grid 26a is returned to a negative potential through a resistor 28 so that triode 26 is normally not conducting any plate current and the plate potential is the positive potential of the D.C. source 10.

When a signal has traveled from one transducer to another over sonic path 19, a sudden increase in signal at detector 23 causes a negative pulse to appear across resistor 25, which is communicated through diode 33 and capacitor 36 to grid 27a of triode 27. There, a decrease in plate current through the plate resistor 34 of plate 27b occurs and the resultant rise in voltage at the plate 27b is communicated to the grid 26a of triode 26 through a coupling network consisting of a resistor 29 and a capacitor 30. The resultant regenerative effect results in triode 26 conducting and triode 27 not conducting plate current. Since plate 27b under these conditions is at low voltage, the modulator 12 connected to this point terminates the electrical wave train delivered to transducers 17 and 18.

After the sonic pulse originally transmitted by transducer 18 is reflected back from the opposite end of sonic path 19 to transducer 18, another negative pulse is produced by the detector 23 across the resistor 25. This is communicated through the diode 32 and the coupling network 29 and 30 to grid 26a which is conducting, reducing the plate current. This regenerative action reverses the state of conduction of triodes 26 and 27 so that the plate 26b now rises to the value of the positive supply voltage of D.C. source 10 generating a new pulse or wave train into the power amplifiers 13 and 14.

The above sequence repeats itself indefinitely generating a sequence of wave trains or pulses with a repetition frequency of $C/2L$ where C is the speed of sound in the fluid and L is the length of the sonic path in the fluid between the transducers. If there be a disturbance interrupting the sequence, triode 27 will conduct due to the charge of the coupling capacitor 36 through the resistor 31, which results in a non-conducting state for triode 26, thus initiating a new pulse for modulator 12 by generating a square wave at plate 26b with a repetition frequency of $C/2L$.

To obtain a voltage proportional to $V/C$ a step charge and discharge circuit is provided. This consists of a capacitor 48 connecting to the plate output 22d of the pentode, and to the plate of diode 47, and to the cathode of diode 46, whose plate is connected with resistor 44 and capacitor 45 to ground 45a. When the square wave output from the pentode 22 is positive the shunt diode 47 conducts and charges the bottom plate of coupling capacitor 48 to ground potential. This results in an excess charge on capacitor 48, which is transferred to capacitor 45 when the square wave goes negative. The voltage across capacitor 45 is proportional to $V/C$, since this voltage equals the repetition rate times capacitor 48 times resistance 44 times the voltage of the plate pulse and since this latter voltage has already been shown to be proportional to $V/C^2$ and repetition frequency proportional to C.

An output proportional to C is obtained by communicating the output from plate 26b of the multi-vibrator circuit through an amplitude clipper 38 and thence through a step charge and discharge circuit frequency meter 37, similar to the step charge and discharge circuit described above. In this case, the square wave provided by plate 26b has a frequency proportional to C but has its amplitude limited to a fixed value so that the output from the frequency meter 37 is a voltage proportional to C.

Volume flow is thus directly readable without compensation for temperature or nature of the fluid by feeding the $V/C$ voltage across capacitor 45 and the C voltage from frequency meter 37 via switch 40 into dynamometer-galvanometer 42 which then displays the product or V. Cumulative readings are obtainable from watt-hour meter 41, which is in parallel with meter 42.

To obtain a voltage proportional to $\rho C$ (specific acoustic impedance) for mass flow determinations, a signal is used which is proportional to the voltage across the transducer. Thus a separate peak reading detector 21 (e.g. a peak detector such as described in said "Wave Forms") page 503, FIGURE 14.2, and also page 506, FIGURE 14.6 is connected across transducer 18, with the result that its output is proportional to density $\rho$ times C ($\rho C$). (The impedance of the transducer at its electrical terminals is dependent on the product of density times c. With a constant signal current from the power amplifiers, the voltage across the transducer terminals will be proportional to the electrical impedance of the transducer and hence the acoustic impedance of the fluid.) If this voltage is fed via switch 40 to dynamometer-galvanometer 42 the deflection will be proportional to $V/C$ ($\rho C$) or $\rho V$. For a given area of the flow section, the deflection is equal to the area times $\rho V$ or the mass rate of flow. As pointed out previously, the voltage proportional to $V/C$ arises from the plate output of diode 46 and is fed to meter 42. When the switch 40 brings in the voltage from peak detector 21, the meter reading is proportional to the product of the two input voltages.

Although in normal practice it might not be necessary or desirable to measure Mach number $V/C$ and flow in the same instrument, FIGURE 5 illustrates the circuits useable for reading Mach number by means of D.C. volt meter 43 fed by plate output of diode 46.

For cumulative readings a watt-hour meter 41 is positioned so as to integrate with time the product of the output of the plate of diode 46 (which is proportional $V/C$) with either the peak detector 21 output which is proportional to $\rho C$ or the output of frequency meter 37 which is proportional to C.

Figure 6:
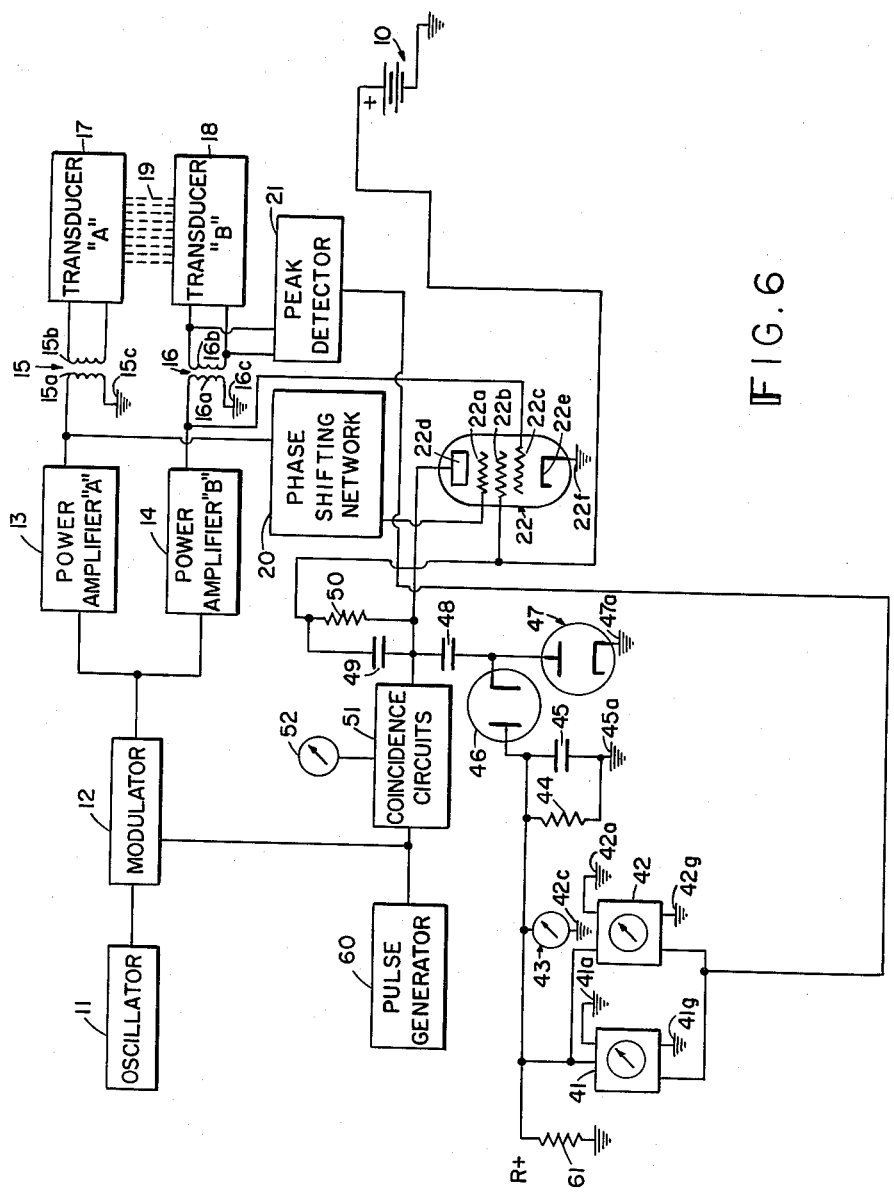
FIGURE 6 is a diagrammatic view of the circuitry used in another embodiment.

Further, the plate 22d is connected with coincidence circuits 51 (e.g. that illustrated on pages 120-123 in "Electronics, Experimental Techniques," by Elmore and Sands, McGraw-Hill, 1949) which in turn connects with the modulator 12. Coincidence circuits 51 comprise a phase sensitive rectifier which changes the A.C. voltage from the phasemeter (pentode 22) to a D.C. voltage whose polarity depends on whether the A.C. voltage is in or out of phase with a reference A.C. voltage, namely, that fed into modulator 12. These coincidence circuits give a positive output if both inputs are positive simultaneously and a negative output when the two inputs have opposite polarity, so that a meter 52 tapping into the coincidence circuits will indicate a voltage proportional to $V/C^2$ either positive or negative depending on the direction of flow. If an oscilloscope is substituted for the meter 52, instantaneous transient displays can be obtained.

Where the change in the speed of sound in the fluid is negligible under the conditions used, or where meters or charts calibrated for temperature and nature of fluid are preferred to save expense, a fixed repetition rate can be used. In this case, as illustrated in FIGURE 6 the detector-multi-vibrator circuit is omitted (23, 24, 25, 32, 34, 27, 31, 31a, 33, 29, 30, 35, 36, 26, 28) and a separate pulse generator 60 connected to the modulator and coincidence circuits 51. Further, the amplitude clipper 38 and frequency meter 37 are omitted.

In this case, the output of the phasemeter 22, which is a square wave, is transformed by the step charge and discharge circuit (44, 45, 46, 47, 48) to a voltage whose amplitude is proportional to $V/C^2$. A temperature-sensitive resistor 61 may be used to compensate for variations in C, which is otherwise regarded as a constant, or charts may be used. Mass flow in this case would be read from $$(\rho C)\left(\frac{V}{C^2}\right) \text{ or } \frac{\rho U}{C}$$

on the meter.

We claim:

1. In a sonic flow meter, an oscillator providing a continuous wave train, a modulator connected to both said oscillator and a pulse generator so as to provide pulsed wave trains, two separate identical power amplifier means connected in parallel to the output of said modulator, a separate identical transformer having its primary winding connected to each amplifier, a separate identical electro-acoustical transducer having two electrical terminals and connected to the secondary winding of each transformer, said transducers being adapted to be sonically coupled to a fluid and spaced apart along the line of flow of the fluid to form a single sonic path, and phase comparing means connected between both said transducers and metering means; said pulse generator being connected across one of said transducers and arranged so as to fire the modulator only when two sonic pulses are received by the transducer after one has been emitted.

2. Claim 1, including a step and discharge circuit connected between the output of said phase comparing means and said metering means.

3. Claim 1, including a peak detector connected between one transducer and said metering means.

4. Claim 1, including an amplitude clipper and frequency meter in series connected between the output of said pulse generator and said metering means.

5. Claim 1, including a coincidence circuit connected between the output of said phase comparing means and the output of said pulse generator.

6. Claim 1, including a phase shifting network connected between one transducer and an input on said phase comparing means, a detector connected between the second transducer and another input on said phase comparing means, a step and discharge circuit connected between the phase measuring means output and one side of said metering means, an amplitude clipper and frequency meter in series connected between the output of said pulse generator and the second side of said metering means, and a peak detector connected between the second transducer and the second side of said metering means, said metering means being capable of selectively multiplying the signal of said step and discharge circuit with the peak detector signal, and with the amplitude clipper-frequency meter signal.

7. A system for measuring flow of fluid comprising two identical electro-acoustical transducers, each sonically coupled to the fluid and each having only two electrical terminals; said transducers being spaced so as to form a single sonic path of fixed length within the fluid; said path being parallel to the component of flow which is to be measured; electric pulsing means feeding directly to both said transducers so as to provide simultaneous electrical pulses of identical configuration to said transducers resulting in responsive sonic pulses propagating from one transducer to the other along said path; electrical measuring means supplied directly by both said transducers and capable of producing an electrical signal responsive to the interval of time between receipt by the transducers of such sonic pulses; means being provided for controlling the emission of said electrical pulses so as to yield a repetition time equal to that required for a given sonic pulse to be propagated from its source to the opposing transducer back to its source, said repetition rate thus being equal to the speed of sound in the fluid divided by twice said fixed path length; said electrical signal being responsive to the difference in phase of said sonic pulses and thus proportional to the value of the velocity of the fluid divided by the square of the speed of sound within the fluid; means for producing a second electrical signal proportional to said repetition rate and means for multiplying said two signals to produce a resultant signal, said resultant signal being proportional to the velocity of the fluid divided by the speed of sound in the fluid.

8. Claim 7, wherein there are provided additional means to produce an electrical signal proportional to the speed of sound in the fluid and means to multiply said signal together with said resultant signal thus providing a signal proportional to the value of the velocity of the fluid.

9. Claim 7, wherein there are provided means to produce an electrical signal proportional to the value of the product of the density of the fluid and the speed of sound of the fluid, and means for multiplying said signal with said resultant signal to provide a signal proportional to the product of the density and velocity of the fluid.

10. A system for measuring flow of fluid comprising two identical electro-acoustical transducers, each sonically coupled to the fluid and each having only two electrical terminals; said transducers being spaced so as to form a single sonic path of fixed length within the fluid; said path being parallel to the component of flow which is to be measured; electric pulsing means feeding directly to both said transducers so as to provide simultaneous electrical pulses of identical configuration to said transducers resulting in responsive sonic pulses propagating from one transducer to the other along said path; electrical measuring means supplied directly by both said transducers and capable of producing an electrical signal responsive to the interval of time between receipt by the transducers of such sonic pulses; means being provided for controlling the emission of said electrical pulses so that the repetition time is equal to the time required for a given sonic pulse to be propagated from its source transducer to the opposite transducer and then back to the source, the repetition rate being thus equal to the speed of sound in the fluid divided by twice said fixed length.

11. A system for measuring flow of fluid, comprising two identical electro-acoustical transducers each sonically coupled to the fluid and each having only two electrical terminals; said transducers being spaced so as to form a single sonic path of fixed length within the fluid parallel to the component of flow which is to be measured; electrical pulsing means feeding directly to both said transducers so as to provide electrical pulses of identical configuration to said transducers resulting in responsive sonic pulses propagating from one transducer to the other along said path; electrical measuring means energized by the transducers upon receipt of the sonic pulses to produce an electric signal proportional to the time difference between the receipt of the sonic pulses by the two transducers; said electric signal being thus proportional to the velocity of the fluid divided by the square of the speed of sound within the fluid.

References Cited in the file of this patent

UNITED STATES PATENTS

| | | |
|---|---|---|
| 2,274,262 | Wolff | Feb. 24, 1942 |
| 2,280,226 | Firestone | Apr. 21, 1942 |
| 2,480,646 | Grabau | Aug. 30, 1949 |
| 2,618,968 | McConnell | Nov. 25, 1952 |
| 2,669,121 | Garman | Feb. 16, 1954 |
| 2,708,366 | Blocher | May 17, 1955 |
| 2,711,646 | Mendousse | June 28, 1955 |
| 2,724,269 | Kalmus | Nov. 22, 1955 |
| 2,746,291 | Swengel | May 22, 1956 |
| 2,826,912 | Kritz | Mar. 18, 1958 |

OTHER REFERENCES

Article: "Ultrasonic Flowmeter," by Jack Kritz, Instruments and Automation, November 1955.